United States Patent
Rebh et al.

(10) Patent No.: US 11,625,229 B1
(45) Date of Patent: Apr. 11, 2023

(54) CONTEXT FOR COMPONENTS IN AN APPLICATION

(71) Applicant: Amazon Technologies, Inc., Seattle, WA (US)

(72) Inventors: Bradley Aaron Rebh, Kenmore, WA (US); Terence John Michaels, Georgetown, TX (US); Joseph Stankowicz, Seattle, WA (US); Joshua Rainbolt, Federal Way, WA (US); Guthrie Adams, Pflugerville, TX (US); Michael Graeb, Seattle, WA (US); Joseph Thomas, Pflugerville, TX (US)

(73) Assignee: Amazon Technologies, Inc., Seattle, WA (US)

( * ) Notice: Subject to any disclaimer, the term of this patent is extended or adjusted under 35 U.S.C. 154(b) by 830 days.

(21) Appl. No.: 16/578,152

(22) Filed: Sep. 20, 2019

(51) Int. Cl.
*G06F 8/36* (2018.01)
*G06F 9/451* (2018.01)
*G06F 11/36* (2006.01)
*G06F 8/70* (2018.01)

(52) U.S. Cl.
CPC .............. *G06F 8/36* (2013.01); *G06F 8/70* (2013.01); *G06F 9/451* (2018.02); *G06F 11/3664* (2013.01); *G06F 11/3668* (2013.01)

(58) Field of Classification Search
None
See application file for complete search history.

(56) References Cited

U.S. PATENT DOCUMENTS

| | | | |
|---|---|---|---|
| 7,552,420 B1* | 6/2009 | Smith | G06F 9/44505 717/121 |
| 10,375,206 B1* | 8/2019 | Ferreyra | A63F 13/35 |
| 10,572,231 B1* | 2/2020 | Graeb | G06F 8/36 |
| 10,603,583 B1* | 3/2020 | Ferreyra | A63F 13/352 |
| 2004/0015488 A1* | 1/2004 | Anonsen | G06F 16/284 |
| 2007/0094609 A1* | 4/2007 | Gilboa | G06F 8/51 707/999.102 |
| 2011/0078103 A1* | 3/2011 | Teng | G06F 9/451 715/765 |
| 2014/0257883 A1* | 9/2014 | Thompson | G06Q 10/0631 705/5 |

* cited by examiner

*Primary Examiner* — Qing Chen
(74) *Attorney, Agent, or Firm* — BakerHostetler

(57) ABSTRACT

Technology is described for adding a component in an application. A user interface may be provided for selecting a component for the application. A request may be received to add the component in the application. A component context associated with the component in the application may be identified. The component context may be defined in part by a component context rule for adding the component. A determination whether to add the component in the application may be made based in part on the component context.

16 Claims, 12 Drawing Sheets

User Interface 510

Edit Entity Components

Entity Name: Entity_XYZ

Component: Component_123  (Add)

✓ This component satisfies a context and is recommended

Component: Component_456  (Add)

✓ This component does not satisfy a context and is not recommended

We Recommend: Component_789  (Add)

FIG. 5B

CONTEXT FOR COMPONENTS IN AN APPLICATION

BACKGROUND

A software development environment often enables developers to create and build electronic worlds or games. The software development environment may include an execution engine or virtual machine for interpreting code or scripts developed for a world, application or game. Developers may use execution engines to construct video games for consoles, mobile devices and personal computers. The software development environment may provide a suite of visual development tools and reusable software components to aid in the development of electronic worlds, applications or games. Execution engines may provide various capabilities that are useful for development, such as a rendering engine for two-dimensional (2D) or three-dimensional (3D) graphics, an audio engine, a physics engine, artificial intelligence, networking, animation, etc.

In one example, software development environments with execution engines may enable the development of electronic worlds, applications or games using a component-entity system. In the component-entity system, an object in a game scene may be considered an entity (e.g., characters, models, enemies, bullets, vehicles), and the entity may include one or more components which add a behavior, a functionality, or an interactive using interface control. The behavior or functionality of the entity may be changed at runtime by adding, modifying or removing components for that entity. Execution engines that use the component-entity system may experience various benefits, such as improved implementation of world-design ideas, increased speeds for compile/test/debug cycles and increased agility during development.

BRIEF DESCRIPTION OF THE DRAWINGS

FIG. 5B illustrates a user interface that enables a component to be added to an entity according to an example of the present technology.

DETAILED DESCRIPTION

Figure 1:
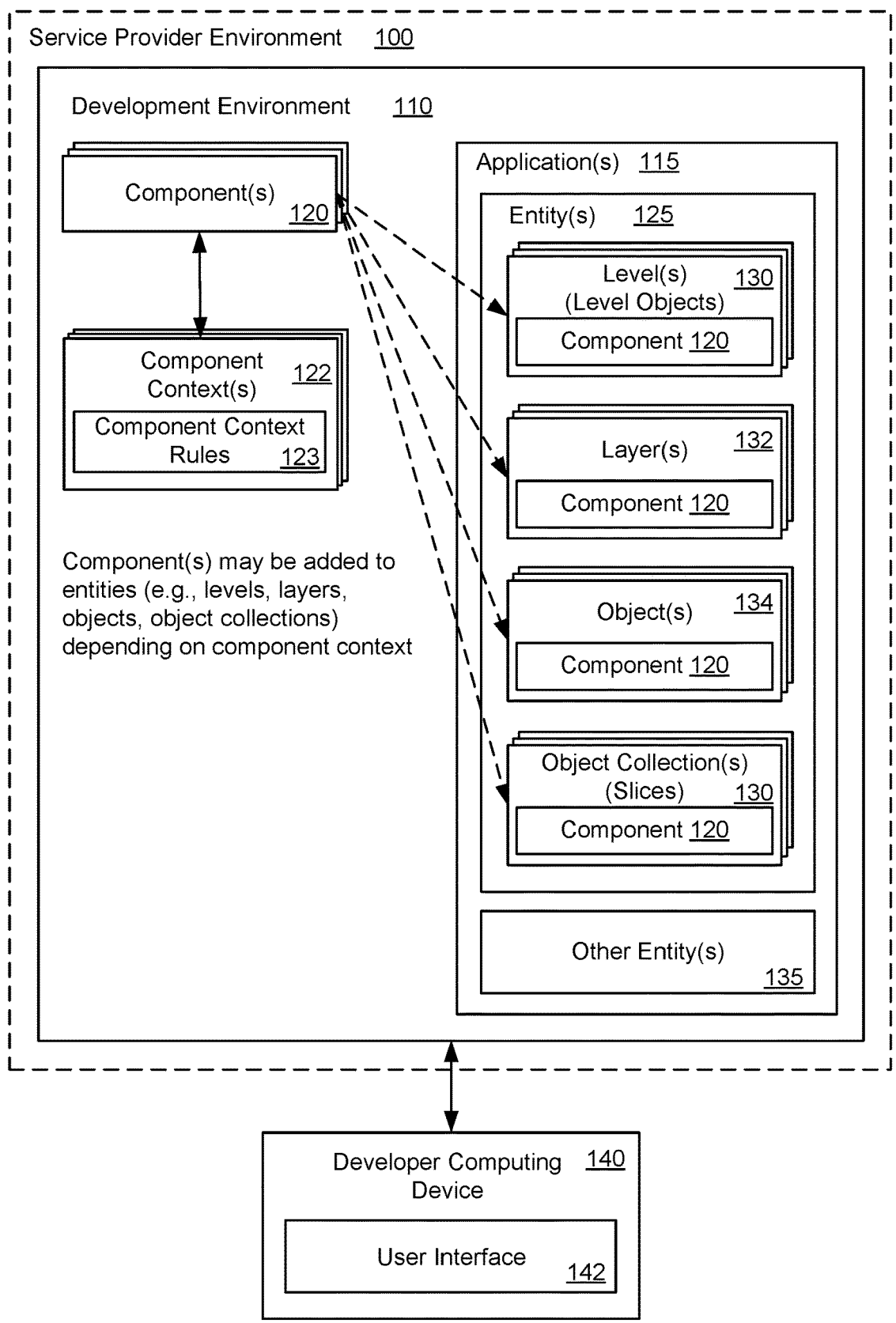
FIG. 1 illustrates a system and related operations for adding components in a development environment based on component context associated with the components according to an example of the present technology.

Technologies are described for adding a component to an electronic environment, world, or game being developed in a development environment based on a component context associated with the component. The component may provide a defined behavior or functionality to an entity or container for components, which may correspond to an object, level, layer, system entity, or another entity type to which the component is added. In one example, a request to add the component may be received. The request may be to add the component to a level in the development environment, a layer in the development environment, an object in the development environment, a collection of configured objects in the development environment or another entity type in the development environment. A component context associated with the component may be identified, where the component context may be defined in part by a component context rule for adding the component in the development environment. Depending on whether the component satisfies the component context, the component may be added in the development environment.

In one configuration, during a creation of the component, the component context to be associated with the component may be received. For example, the component context may be received from the development environment which may provide the component context that represents an entity type, such as a level, layer, object, collection of objects, another entity type, or other context for the component which is being added. The component may be created and the component context may be associated with the component. The component context may define certain contexts in which the component is permitted to be added, the component is not permitted (or not recommended) to be added, the component is to be added with other components, etc.

In one example, the component context may indicate that the component is constrained to be associated with a certain entity type (e.g., a layer-only component), or that the component is constrained to have certain settings or properties. After the component is created, the component may be available for use by developers building electronic environments or games using the development environment.

In one example, the component may have one or more settings or properties, which may be adjustable to obtain a defined behavior or functionality to an object, layer, etc. to which the component is added. The component may be associated with a category, such as physics simulation, animation, camera, gameplay, etc.

In one example, the request to add the component may be received in the development environment. The request may be received via a user interface of a developer computing device (e.g., a computing device associated with a user or developer that is creating an electronic world or game using the development environment).

In one example, the request may be to add the component to an object (i.e., the entity type is object) in the development environment. The object may be a visible or non-visible world object or game object with which a player may interact in a runtime environment. The entity may be associated with a unique identifier and a container that contains one or more components for the entity.

In another example, the request may be to add the component to a level (i.e., the entity type is a level) in the development environment. The level, also known as a world or map, may represent a space or area available to a player when completing a game objective. The level may be one of multiple levels in an electronic world or game.

In yet another example, the request may be to add the component to a layer in the development environment (i.e., the entity type is the layer). The layer may be one of multiple layers that are included in the level. The layer may be useful for organizing content in an electronic world or game. For example, the layer may be associated with characters in a game or vegetation in an electronic world or game.

In a further example, the request may be to add the component to a collection of configured objects (or slices) in the development environment (i.e., the entity type is the collection of configured objects). The collection of configured objects may be stored as a single unit, and may be used to group objects and other slices for reuse.

In one configuration, the component context associated with the component that is requested to be added may be identified in the development environment. As previously described, the component context may define certain contexts in which the component is permitted to be added to an entity, the component is not permitted (or not recommended) to be added, the component is to be added with other components, etc. The component context may be checked to determine whether the component is permitted to be added in accordance with the request. For example, when the component requested to be added to an entity is determined to satisfy the component context, the component may be added to the object, level, layer, the collection of configured objects in the development environment or another type of entity. In another example, when the component requested to be added is determined to not satisfy the component context, the component may not be added to the object, level, layer, the collection of configured objects in the development environment, etc.

In one example, when the component context is not satisfied, a notification may be sent to the developer computing device indicating that the component context is not satisfied. In some cases, an override notice may be received from the developer computing device, and the notification may be overridden and the component may be added although the component context is not satisfied.

In one configuration, a user interface may be provided to the developer computing device to enable the developer to add, modify or remove components, as permitted by the component context associated with the components. For example, the user interface may allow for the addition, modification or removal of components when the component context is satisfied. The user interface may provide a recommendation of components that are permitted to be added, modified or removed (or component settings or properties that are permitted to be added, modified or removed) based on the component context. In another example, the user interface may provide a notification or warning for the addition, modification or removal of components when the component context is not satisfied. In other words, the user interface may not prevent the addition, modification or removal of components when the component context is not satisfied.

FIG. 1 illustrates an example of adding component(s) 120 in a development environment 110 based on a component context 122 associated with the component(s) 120. The development environment 110 may operate in a service provider environment 100. Alternatively, the development environment 110 may operate on a user's or developer's local computing device. The component 120 may be added to an electronic environment, world or game being developed in response to a request received from a user interface 142 of a developer computing device 140. For example, the request may be to add the component 120 to an entity 125, which may be, but is not limited to, a level 130 (e.g., a level object) in the development environment 110, a layer 132 in the development environment 110, an object 134 (e.g., a game object) in the development environment 110 and/or an object collection 136 (or a collection of configured objects or a slice) in the development environment 110. In one example, the request may be to add the component 120 to other entities 135 having a type that is different than a level, a layer, an object or an object collection. The level 130, the layer 132, the object 134 and/or the object collection 136 may correspond to entities 125 (or world entities) or containers for entities, and may be associated with an application 115 that is being developed using the development environment 110. The component 120 may be added to the entity 125, which may correspond to the level 130, the layer 132, the object 134 and/or the object collection 136 based on the component context 122 associated with the component 120.

In one example, the component 120 may have been previously authored or created, and the component context 122 may have been associated with the component 120. The component context 122 may define certain contexts in which: the component 120 is permitted to be added, the component 120 is not permitted (or not recommended) to be added, the component 120 is to be added with other components, etc. The component context 122 may define to which entity types (e.g., layers, objects) the component 120 may be added. After the component 120 is created, the component 120 may be available for use by developers interacting with the development environment 110, such as a developer associated with the developer computing device 140.

In one example, the component 120 may be identified from a list of components in the development environment 110, and the request to add the component 120 to the entity 125, such as the level 130, the layer 132, the object 134 and/or the object collection 136 may be received from the developer computing device 140. The component context 122 associated with the component 120 may be checked to determine whether the component 120 is permitted or not permitted (or not recommended) to be added in accordance with the request received from the developer computing device 140.

In one example, a determination may be made that the component 120 is permitted to be added to the entity 125, such as the level 130, the layer 132, the object 134 and/or the object collection 136 in accordance with the request, based on the component context 122 associated with the component 120 being satisfied. In this example, a notification may be provided to the user interface 142 on the developer computing device 140 indicating that the component 120 has been added.

In another example, a determination may be made that the component 120 is not permitted (or not recommended) to be added to the entity 125, such as the level 130, the layer 132, the object 134 and/or the object collection 136 in accordance with the request, based on the component context 122 associated with the component 120 being not satisfied. In this example, a notification may be provided to the user interface 142 on the developer computing device 140 indicating that the addition of the component 120 is not permitted or recommended. In one example, based on the notification, the developer associated with the developer computing device 140 may not attempt to add the component 120 in view of the notification. In another example, the developer computing device 140 may send an override notice, and the component 120 may be added although the component context 122 associated with the component 120 is not satisfied. In one example, when the component 120 is added and the component context 122 is not satisfied, a generic component wrapper may be used for the component 120 to mitigate or account for the component text 122 not being satisfied. Using a generic component wrapper may be considered a type of override used either by the development environment or approved by the software developer.

In one example, the component context 122 may be defined in part by a component context rule 123, which may indicate that the component 120 is permitted or recommended to be added in certain contexts, or that the component 120 is not permitted or recommended to be added in certain contexts. As non-limiting examples, the component context 122 may indicate that the component 120 is a layer-only component or an object component, or the component 120 may be added to each of level(s) 130, layer(s) 132, object 134 and object collection 136, the component 120 may only be added once to a system entity), or the component 120 is to have a set of other components added as well, or the component 120 is to have certain settings or properties, etc.

In one configuration, the user interface 142 provided to the developer computing device 140 may enable the developer to receive notification(s) indicating when a particular component 120 is permitted or recommended to be added to a particular entity type (e.g., layer, object, object collection or another entity type), as well as notification(s) indicating when a particular component 120 is not permitted or not recommended to be added to a particular entity type. In one example, the user interface 142 may simply provide informational notifications to the developer when adding component(s) 120, but the developer may ultimately determine to add or not add component(s) 120 to the entity 125, such as the level 130, the layer 132, the object 134 and/or the object collection 136.

As a non-limiting example, a user interface (UI) canvas may be created using the development environment 110, where the UI canvas may serve as a backdrop for game user interface elements. The UI canvas may be for the UI at game runtime. After the UI canvas has been created, objects, components, slices, etc. may be added to the UI canvas. The UI canvas may have a collection of objects, and each of those objects may have components that have been added. In this example, component context 122 may be useful for determining which components may be added to certain objects. As a more detailed example, the component context 122 may prevent a developer from attempting to add non-UI components to UI objects (e.g., prevent a developer from placing a game functionality or a 3D model into UI buttons). In addition, the UI canvas may itself support components, so there may be components that are addable to the UI canvas which are separate from components that are addable to UI objects that are children of the UI canvas.

As another non-limiting example, a component 120 for a 'large body of water' may be created, as opposed to an ocean component, a lake component, a river component, etc. In this example, the component 120 for the 'large body of water' may act in a distinct way depending on whether the component is added to a level 130, an object 134, etc., as defined by the component context 122. For example, when the component 120 is added to a level 130, the component 120 may act like an ocean. When the component 120 is added to an object 134, the component 120 may act like a lake. Therefore, the functionality or properties of the component 120 may slightly change depending on the context in which the component 120 is added in the development environment 110.

As yet another non-limiting example, a lighting component may be created, and the lighting component may act in a distinct way for different contexts. For example, the lighting component may act differently when placed on different levels (e.g., a brighter light when inside a shopping mall in a game world versus a dimmer light when inside a movie theater in the game world), as defined by the component context 122. Therefore, the functionality or properties of the lighting component may slightly change depending on the context in which the component is added.

In one non-limiting example, the component context 122 may impact which components 120 are able to be viewed and edited using the user interface 142. For example, a game world may have vegetation that consists of hundreds or thousands of rock components, shrub components, etc. In this example, it may be undesirable to show each of the rock components, shrub components, etc. as being editable in the user interface 142. Therefore, these components 120 may be associated with a component context 122 which defines the components 120 to be part of the vegetation for a defined object, and that the components 120 should not be shown in the user interface 142 at other times. In other words, a separate component context 122 may be used for components 120 that are not to be visible for editing purposes in some contexts but are visible in the correct context.

In past solutions, components would be added to objects in a development environment without significant constraints. For example, in past solutions, components could often be added regardless of whether the components were compatible with the objects, regardless of whether the components were compatible with each other, regardless of whether certain components were missing, regardless of whether the number of a certain component was in excess (e.g., duplicate base system objects), etc. Thus, in past solutions, developers might make mistakes and create errors when developing electronic worlds (e.g., placing a 2D component in a 3D game world, placing an excess number of ocean components on a particular level). In past solutions, there were no built-in logical constraints or warnings to prevent developers from making obvious mistakes when adding, modifying or removing components in the development environment. Rather, in past solutions, developers would manually create and share lists of written rules that detailed acceptable actions and unacceptable actions with respect to building the electronic environment in the development environment. In past solutions, when errors were made during development, the developer would only become aware of the errors when executing the electronic world in a runtime environment.

In the present technology, when developers attempt to add, modify or remove components 120 (e.g., in an object 134, level 130, layer 132 and/or object collections 136), a component context 122 associated with the components 120 may be checked. The component context 122 may provide component context rules for modifying, adding, or removing the components 120 in certain contexts. When a particular component 120 is attempted to be modified, added, or removed that does not satisfy the component context 122, a notification may be provided to the developer. The notification may include information that describes a reason for the component context 122 not being satisfied and possible solutions for remedying the situation. The developer may use the notification to make changes to the component(s) 120 being added or removed, or changes to component settings or properties that are being modified, thereby proactively fixing errors prior to running an electronic world, application or game in a runtime environment.

Figure 2:
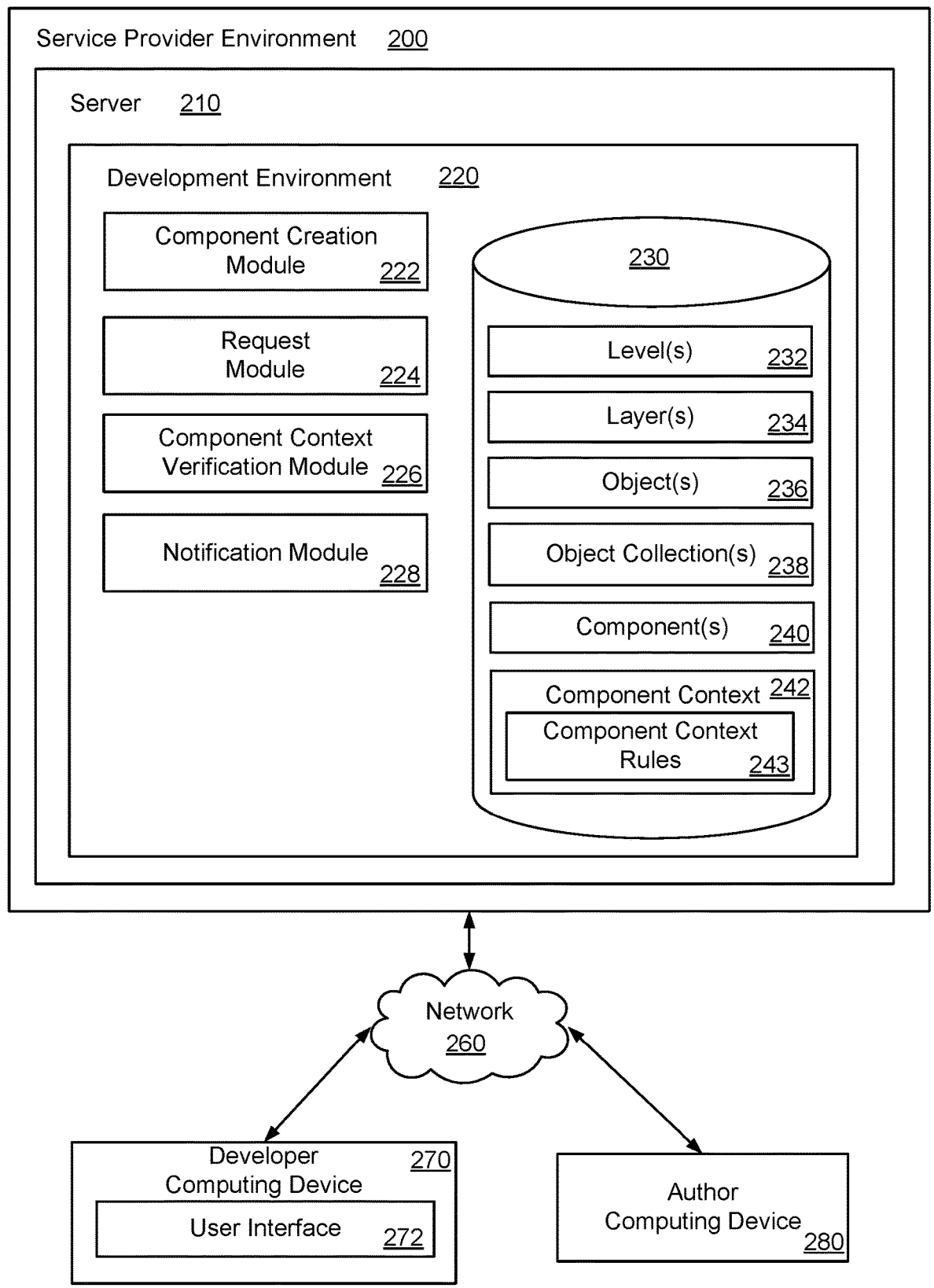
FIG. 2 is an illustration of a networked system for adding components to entities in a development environment based on component context associated with the components according to an example of the present technology.

FIG. 2 illustrates example components of the present technology in a service provider environment 200. The service provider environment 200 may include a server 210 that operates a development environment 220. The development environment 220 may be used to create and build electronic worlds, applications or games based on instructions received over a network 260 from a user interface 272 of a developer computing device 270. For example, the development environment 220 may be used to create level(s) 232 for the electronic worlds, graphical applications or games, segment the level(s) 232 into one or more layers 234, add objects 236 to the layer(s) 234, and add, modify and remove component(s) 240 with respect to the objects 236 (as well as the level(s) 232 and layer(s) 234) in view of component context 242 associated with the component(s) 240. The levels 232, the layers 234, the objects 236 and object collections 238 may be considered to be entities (i.e., types of entities), where an entity may have a unique identifier and may be associated with a container that contains one or more components 240 for the entity.

In one example, the server 210 may include a data store 230 that includes level(s) 232, which may be associated with a developer account that belongs to a developer using the developer computing device 270. The level(s) 232 may include level file(s) that are used to organize gameplay content. For example, a particular level (or area or map) in the electronic world, graphical application or game may represent a space or area available to a player to advance to or move through when completing a game objective. The level 232 may contain the level file along with support files that hold game data, scripts, terrain and additional references that may be used for the level 232 to run in-game.

The data store 230 may include layer(s) 234, which may be associated with the developer account that belongs to the developer using the developer computing device 270. The layer(s) 234 may be discrete data files organized from the level(s) 232. In other words, a given level 232 may be organized into multiple layers 234. The layer(s) 234 may be used to organize content for the electronic world, graphical application or game. For example, a layer 234 may be created for characters in the electronic world, graphical application or game, and a separate layer 234 may be created for vegetation in the electronic world, graphical application or game. The layer 234 may include various settings or properties, such as a layer name, a status of the layer (e.g., the layer is active when a level starts, the layer is inactive when the level starts, the layer is active in editor mode), etc.

The data store 230 may include object(s) 236. The object(s) 236 may be associated with the developer account that belongs to the developer using the developer computing device 270. The object(s) 236 may be associated with the layer(s) 234 (e.g., one or more objects 236 may be added to a particular layer 234). The object 236 may be a visible or non-visible game object with which a player interacts with in a game runtime environment.

The data store 230 may include object collection(s) 238. The object collection(s) 238 may be associated with the developer account that belongs to the developer using the developer computing device 270. The object collection(s) 238 (or collection of configured objects or slices) may be a collection of configured objects that are stored as a single unit, and may be used to group objects and other object collection(s) 238 for reuse. The object collection(s) 238 may be nested into a cascading hierarchy. For example, a level, a house, a car, and an entire world may be object collection(s) 238 that depend on or cascade from a number of other object collection(s) 238. Thus, the object collection(s) 238 may include a collection of objects including their components and properties, and may also include instances of other object collection(s) 238.

The data store 230 may include component(s) 240. The component(s) 240 may be associated with the developer account that belongs to the developer using the developer computing device 270. The component(s) 240 may be added to elements or world elements, which may correspond to the level(s) 232, the layer(s) 234, the object(s) 236 and/or the object collection(s) 238. The component(s) 240 may have one or more settings or properties, which may be adjustable to obtain a defined behavior or functionality for the layer 234, object 236, etc. to which the component 240 is added.

In one example, the component(s) 240 may be associated with a defined category. Non-limiting examples of such categories may include, but are not limited to, artificial intelligence, animation, audio, camera, editor (e.g., comment), environment (e.g., ocean, lightning, rain, sky), gameplay, network, physics, rendering (area light), scripting, shape (e.g., cylinder, polygon, sphere), streaming, terrain (e.g., river, road), user interface, virtual reality, etc. Each component 240 may have various settings or properties, which may be set or defined to describe a particular aspect of the component 240.

The data store 230 may include component context 242. The component context 242 may be defined in part by one or more component context rules 243, and may be associated with a particular component 240. The component context 242 may define certain contexts for a component 240 with respect to modifying, adding or removing the component 240 from the level(s), layer(s), object(s) 236 and/or the object collection(s) 238. For example, the component context 242 may define certain contexts in which the component 240 is permitted to be added, the component 240 is not permitted (or not recommended) to be added, the component 240 is to be added with other components 240, etc.

In one example, the component 240 may include system component(s). The system components may be associated with system entities, which may exist in system component context. The system components may be used to manage areas of the world. For example, the topology or vegetation aspects of the world may be managed using a number of system components. As another example, the system component may be a system file input/output (I/O) component, which may define a system mechanism for reading and writing files to memory. In this example, a constraint or rule may be set that a single system file I/O component may be defined to prevent multiple system I/O components from interfering with each other. In one example, the system components may exist in both the development environment 220, as well as a runtime environment.

In one example, the server 210 may utilize a number of modules for creating the component(s) 240 and adding the component(s) 240 to an electronic world, application or game being developed using the development environment 220, where the component(s) 240 may be added based on the component context 242 associated with the component(s) 240. For example, the server 210 may operate a component creation module 222, a request module 224, a component context verification module 226, a notification module 228, and other applications, services, processes, systems, engines, or functionality not discussed in detail herein.

The component creation module 222 may receive or obtain the component context 242 associated with the component 240 being created in the development environment 220. The component creation module 222 may create the component 240 during a setup process. The component creation module 222 may receive the component context rules or metadata that are to define the component context 242. The component creation module 222 may create the component 240 during the setup process and associate the component context 242 with the component in the development environment 220. After the component 240 and the associated component context 242 are created during the setup process, the component 240 may be available for use in the electronic development environment 220. For example, the component 240 may be available for inclusion in an electronic world, application or game being developed using the development environment 220.

The request module 224 may receive a request to add the component 240 in the development environment 220. For example, the request module 224 may receive the request from the developer computing device 270 via the user interface 272, and the request may be to add the component 240 to the element or world element, which may correspond to the level(s) 232 in the development environment 220, the layer(s) 234 in the development environment 220, the object(s) 236 in the development environment 220 or the object collection(s) 238 in the development environment 220.

The component context verification module 226 may check the component context 242 associated with the component 240 requested to be added with respect to a desired location indicated in the request (e.g., a particular object 236 or layer 234). In other words, the component context verification module 226 may determine whether the request to add the component 240 at the desired location (e.g., the particular object 236 or layer 234) satisfies or follows the component context 242 associated with the component 240. In one example, the component context verification module 226 may determine that the component 240 requested to be added satisfies the component context 242 by checking the component context rules 243. Alternatively, the component context verification module 226 may determine that the component 240 requested to be added does not satisfy the component context 242 by checking the component context rules 243.

The notification module 228 may send a notification to the developer computing device 270 indicating that the component 240 requested to be added satisfies the component context 242. In another example, the notification module 228 may send a notification to the developer computing device 270 indicating that the component 240 requested to be added does not satisfy the component context 242. The notification module 228 may send the notification for display via the user interface 272 on the developer computing device 270.

The developer computing device 270 and the author computing device 280 may comprise, for example, processor-based systems. The developer computing device 270 and the author computing device 280 may be devices such as, but not limited to, desktop computers, laptop or notebook computers, tablet computers, mobile devices, handheld computers, workstations, network computers, or other devices with like capability.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 260 may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An application programming interface (API) may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
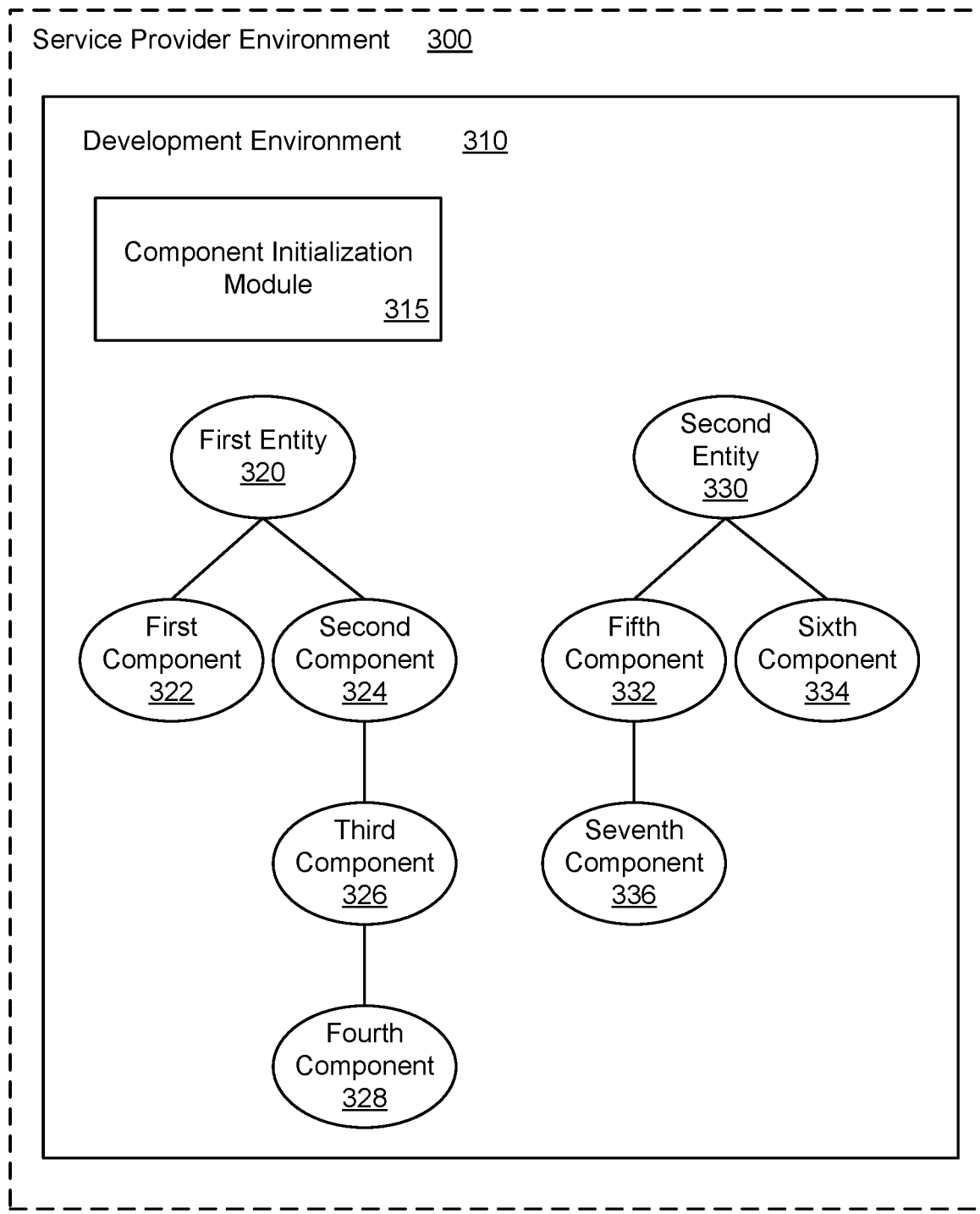
FIG. 3 illustrates a system and related operations for initializing components in a development environment according to an example of the present technology.

FIG. 3 illustrates an example of a system and related operations for initializing components in a development environment 310. The development environment 310 may operate in a service provider environment 300. The development environment 310 may include a component initialization module 315. The component initialization module 315 may be operable to initialize the components in the development environment 310. For example, the development environment 310 may initialize components which are system components prior to non-system components in the development environment 310. In other words, since system components apply globally to the development environment 310, the system components may be initialized prior to other component types.

In another example, the components may be initialized in accordance with a dependency order, where components that have dependencies on other components may be initialized prior to components that do not have dependencies on other components. In this example, initializing components according to their dependency order may improve efficiency and decrease an overall time taken to initialize the components.

In the example shown in FIG. 3, the component initialization module 315 may initialize components for a first entity 320 and a second entity 330 in accordance with the dependency order. The first entity 320 and the second entity 330 may be a combination of levels, layers, objects, or object collections. In this example, the first entity 320 may include a first component 322, a second component 324, a third component 326, and a fourth component 328. The second entity 330 may include a fifth component 332, a sixth component 334 and a seventh component 336. In this example, the first component 322, the fourth component 328, the sixth component 334 and the seventh component 336 do not have dependent components. On the other hand, the second component 324, the third component 326 and the fifth component 332 may have dependent components. Thus, in this example, the third component 326 and the fourth component 328 may be initialized prior to the second component 324 in accordance with the dependency order, and the seventh component 336 may be initialized prior to the fifth component 332 in accordance with the dependency order.

As a non-limiting example, if a car component is to have an engine component running before the car component is able to run, then the engine component may be initialized prior to the car component.

As another non-limiting example, a video game being developed may include an engine entity and a car entity as two separate entities that each has an engine component and a car component. Component containers may exist on each entity independently, and cross dependency initialization across entity boundaries may not be performed. In other words, for a first car entity that includes five car components, these five components for the first car entity may be initialized in a dependency order. For a second car entity that includes three car components, these three components for the second car entity may be initialized in a dependency order, which may be separate and independent of the initialization of the five car components for the first car entity.

Figure 4:
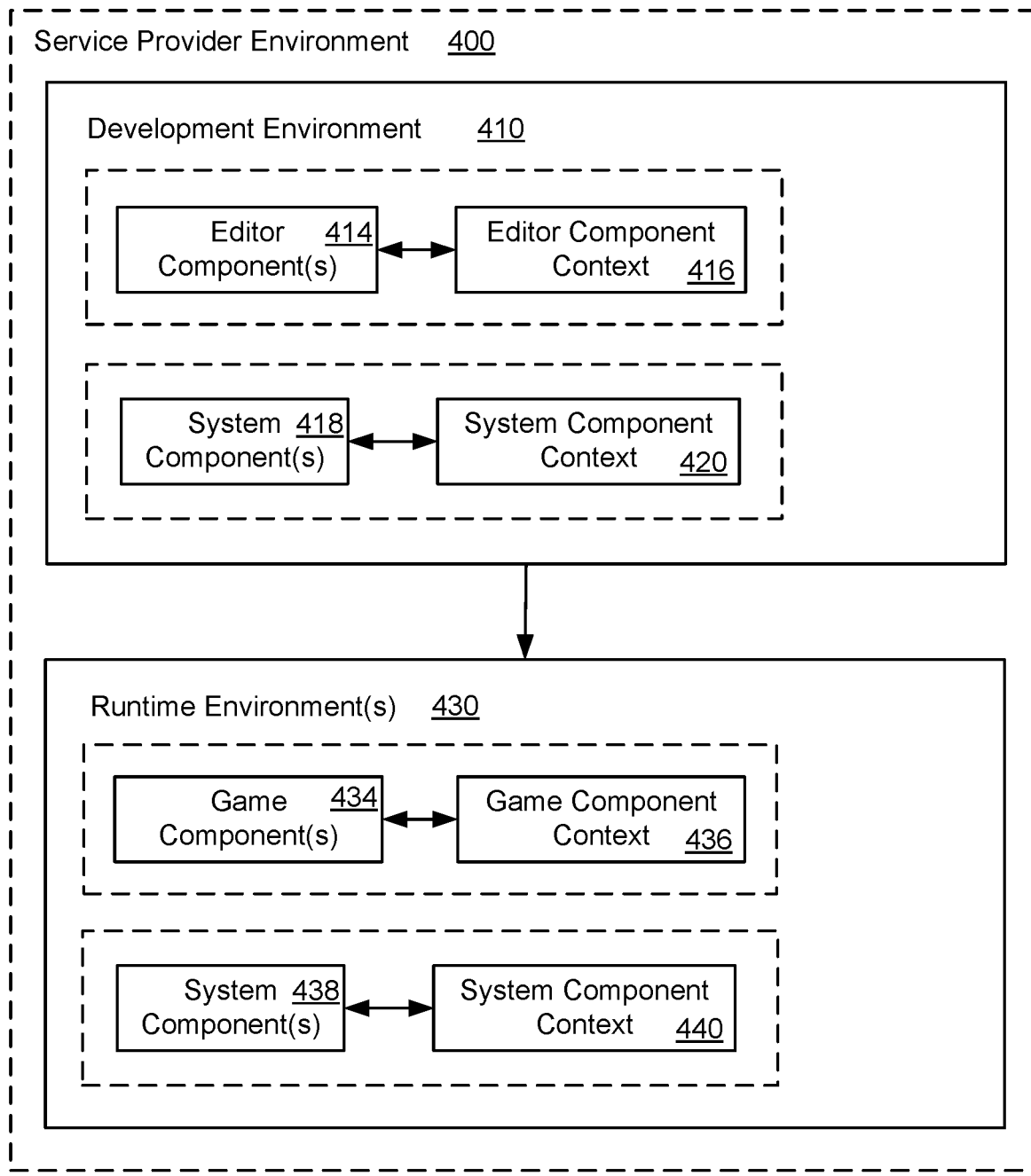
FIG. 4 illustrates a development environment for adding component(s) and a runtime environment for testing the component(s) according to an example of the present technology.

FIG. 4 illustrates an example of a development environment 410 for adding editor component(s) 414 and a game runtime environment 430 for testing game component(s) 434. The development environment 410 and the game runtime environment 430 may operate in a service provider environment 400. The development environment 410 may also be referred to as an editor mode, and the game runtime environment 430 may also be referred to as a game mode, execution mode or runtime environment.

In one example, the editor component(s) 414 having associated editor component context 416 may be added to a game being developed in the development environment 410. The editor component(s) 414 may be added to an entity, such as a level, layer, object, etc. in the development environment 410. Further, system component(s) 418 having an associated system component context 420 may be added in the development environment 410. The system component(s) 418 may be added to, for example, system entities in the development environment 410. As a non-limiting example, the system component 418 may be a system file I/O component, which may define a system mechanism for reading and writing files to memory.

In one example, a developer may switch from the development environment 410 to the game runtime environment 430 to test the game being developed. In the game runtime environment, the game component(s) 434 being tested may have associated game component context 436 (or runtime game context), where the game component(s) 434 may be a game representation of the editor component(s) 414 in the development environment 410. The game component(s) 434 and the game component context 436 may have a mutual relationship with the editor component(s) 414 and the editor component context 416 in the development environment 410), in that the game component(s) 434 and the game component context 436 may be derived from the editor component(s) and the editor component context 416, and vice versa. For example, when the editor component(s) 414 are added to the development environment 410, corresponding game component(s) 434 may be created for the game runtime environment 430. Further, the runtime environment 430 may include system components 438 and associated system programming context 440, where the system components 438 and the associated system programming context 440 in the game runtime environment 430 may be the same or different than the system components 418 and the associated system programming context 420 in the development environment 410. In another example, certain editor components 414 may not be used in the runtime environment 430 and may be removed so that there is a reduced set of game components 434 in the runtime state.

In one example, when the game runtime environment 430 is exited and the developer returns back to the development environment 410, the game component(s) 434 (and associated game entities) and the associated game component context 436 may be available again. In one example, the editor component(s) 414 (and associated entities and editor component context 416) in the development environment 410 may be partitioned from the game component(s) 434 (and associated game entities and game component context 436) in the game runtime environment 430. For example, the editor component context 416 may be filtered from the game component context 436 by filtering out a portion of the editor component context 416.

Figure 5A:
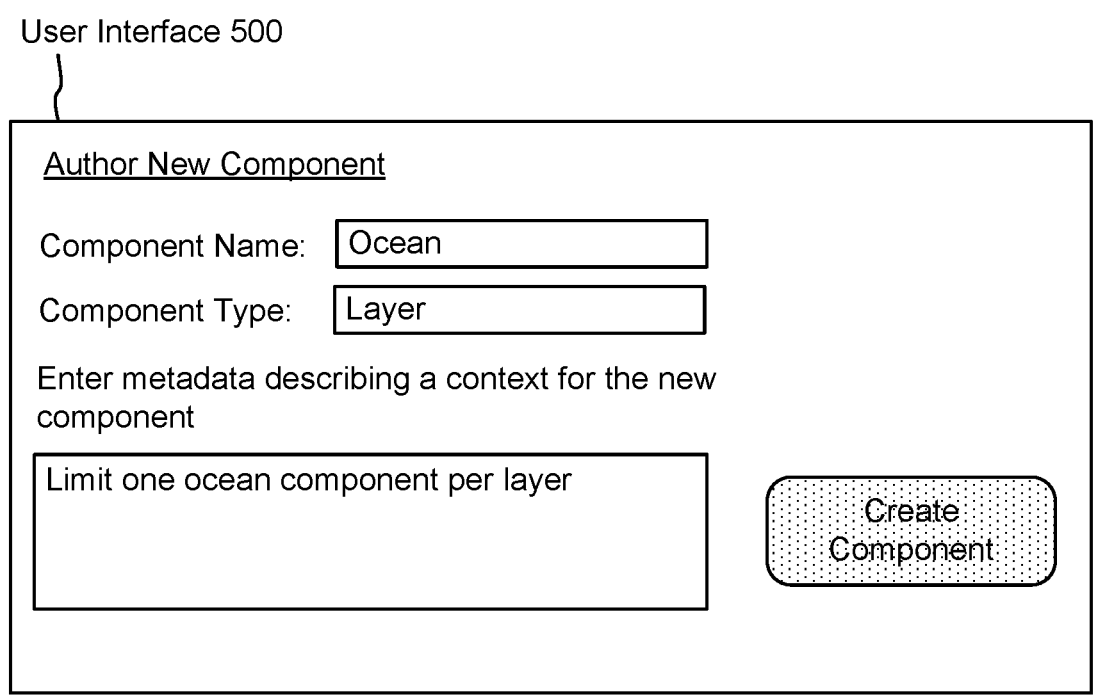
FIG. 5A illustrates a user interface that enables a new component to be created based in part on a received component context according to an example of the present technology.

FIG. 5A illustrates an example of a user interface 500 that enables a new component to be created based in part on a received component context. The new component may be authored or created by an author. The author may use the user interface 500 to specify a component name. The author may use the user interface 500 to specify a component type (e.g., whether the component is a layer component or an object component). The author may use the user interface 500 to enter metadata describing a component context for the new component. In other words, the user interface 500 may enable the author to define the component context that is to be associated with the new component. The component context may be defined by a component context rule, which may define certain contexts for which the new component is permitted to be added, the new component is not permitted (or not recommended) to be added, or the new component is to be added with other existing components. After the appropriate information is entered by the author via the user interface 500 to define the new component and the component context constraints or rules for the new component, the author may select an option to create the new component.

The new component may be available for use by developers in a development environment.

In one configuration, the new component may be created by inserting computer source code or instructions using the development environment. For example, the component context may be checked in the computer source code format or instruction format, and not via a graphical interface. The context may be checked in the computer source code format using a pre-complier, interpreter, or a compiler prior to executing the computer source code.

FIG. 5B illustrates an example of a user interface 510 that enables a component to be added to an entity. The component may be added to the entity by a developer that is creating or building an electronic world, application or game in a development environment. The developer may use the user interface 510 to select an available entity. The entity may be included in the electronic world, application or game. The developer may select a component to add to the entity (e.g. from a drop-down menu), or may type a known component name to add that component to the entity. In one example, when the component is attempted to be added to a particular entity, the user interface 510 may display a notification. The notification may indicate to the developer whether the component satisfies a component context and is recommended, or whether the component does not satisfy a component context and is not recommended. In one example, the notification may simply notify the developer on whether adding the component is recommended or not recommended, but the developer may have an option to add the component via the user interface 510.

In one example, when the notification indicates that the component does not satisfy a component context and is not recommended, the user interface 510 may display a list of alternative components that are recommended to be added for that particular entity. The developer may have an option to select one of the alternative components from the list via the user interface 510.

In one example, after a particular entity (e.g., level, layer, object) is selected by the developer, the user interface 510 may filter the components that are shown (e.g., in a drop-down menu) as being able to be added to that entity. In other words, the user interface 510 may show components that are compatible with the entity, and not show components that are not compatible with the entity.

Figure 5C:
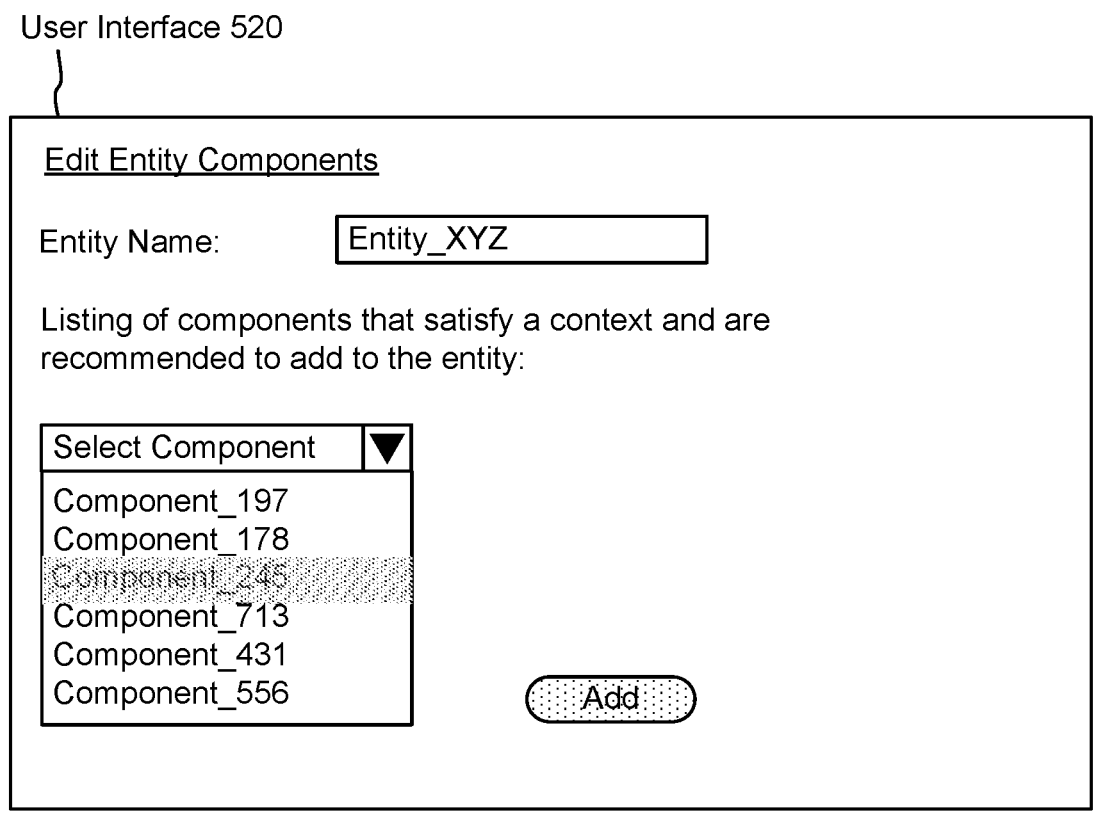
FIG. 5C illustrates a user interface that enables a component to be added to an entity according to an example of the present technology.

FIG. 5C illustrates an example of a user interface 520 that enables a component to be added to an entity. The user interface 520 may include a list of components that are permitted to be added to an entity of a defined type, such as a list, a level, an object or an object collection. The components on the list may be included in the list based on a component context that is defined in part by a context rule for adding components to the entity. The list of components shown via the user interface 520 may be filtered to include components that satisfy the component context and exclude components that do not satisfy the component context. In other words, components that do not satisfy the component context may not be displayed on the user interface 520, whereas components that satisfy the component context may be displayed on the user interface 520. This configuration allows a software developer to avoid errors that might otherwise be created when context is not properly taken into account.

Figure 6:
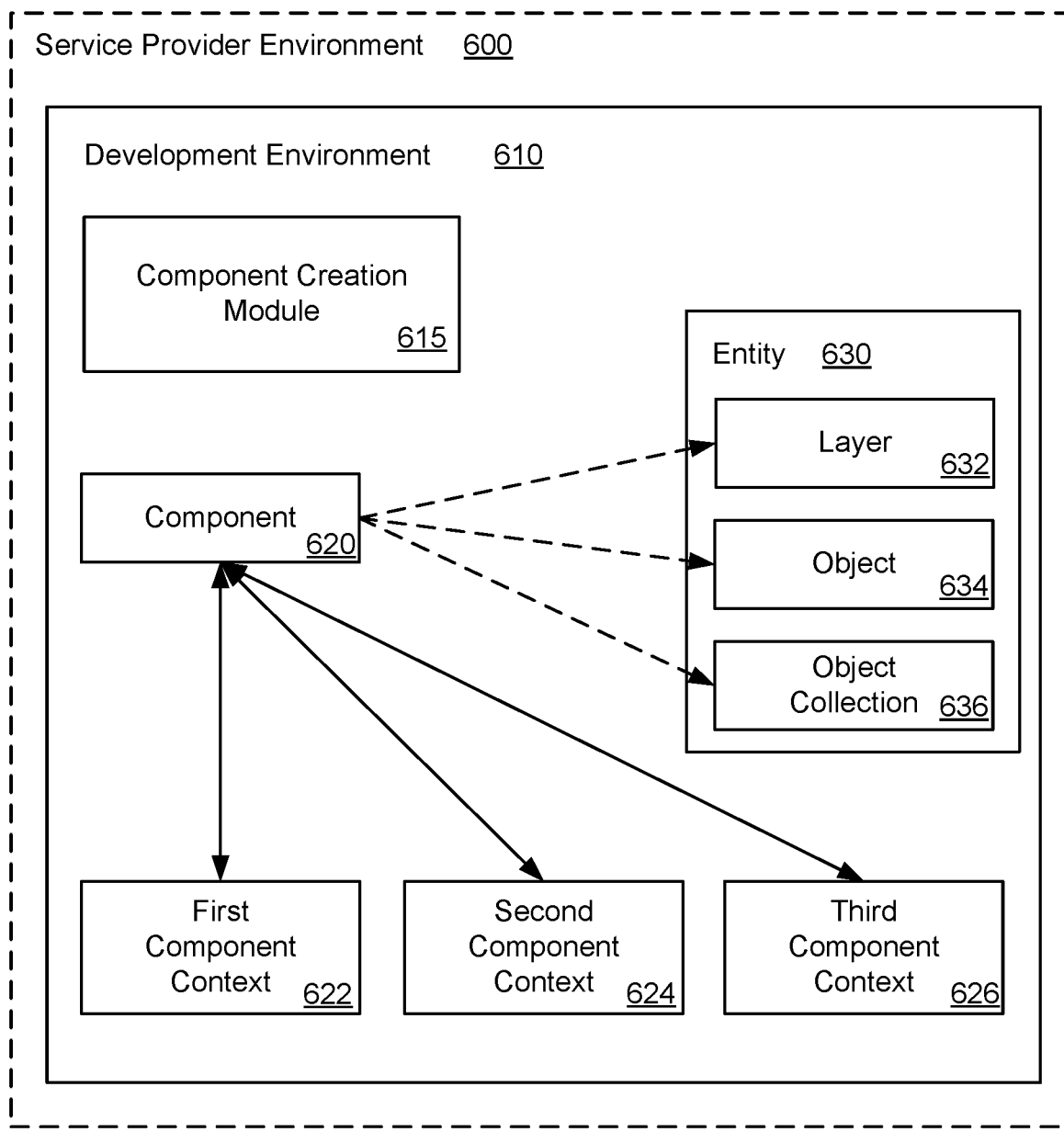
FIG. 6 illustrates a system and related operations for defining multiple component contexts for a component in a development environment according to an example of the present technology.

FIG. 6 illustrates an example of a system and related operations for defining multiple component contexts for a component 620 in a development environment 610. The development environment 610 may operate in a service provider environment 600. The development environment 610 may include a component creation module 615. The component creation module 615 may be operable to assign the multiple component contexts to the component 620, where the component 620 may be permitted to be added to an entity 630, such as a layer 632, an object 634 (which may include a system object or a game object), or an object collection 636 based on the multiple component contexts that are associated with the component 620.

In the example shown in FIG. 6, the component creation module 615 may assign a first component context 622 to the component 620, a second component context 624 to the component 620, and a third component context 626 to the component 620. As an example, the component creation module 615 may define the first component context 622 such that, if the component 620 is requested to be added to the layer 632, the first component context 622 may be satisfied. Further, the component creation module 615 may define the second component context 624 such that, if the component 620 is requested to be added to the object 634, the second component context 624 may be satisfied. Further, the component creation module 615 may define the third component context 626 such that, if the component 620 is requested to be added to the object collection 636, the third component context 626 may be satisfied. Thus, in this example, the component 620 may be added to either the layer 632, the object 634 or the object collection 636 and still satisfy at least one of the first component context 622, the second component context 624 or the third component context 626.

As a non-limiting example, the component 620 may be a comments component, which may allow a developer to enter text comments into a dialog box. The comments component may be useful in explaining how scripts or components interact with other scripts or components. The comments component may also be useful for sending descriptions, instructions or notes to team members. Since the comments component may be applicable to each of the layer 632, the object 634 and the object collection 636, the component creation module 615 may assign the multiple component contexts that enable the comments components to be added to the layer 632, the object 634 and/or the object collection 636.

Figure 7:
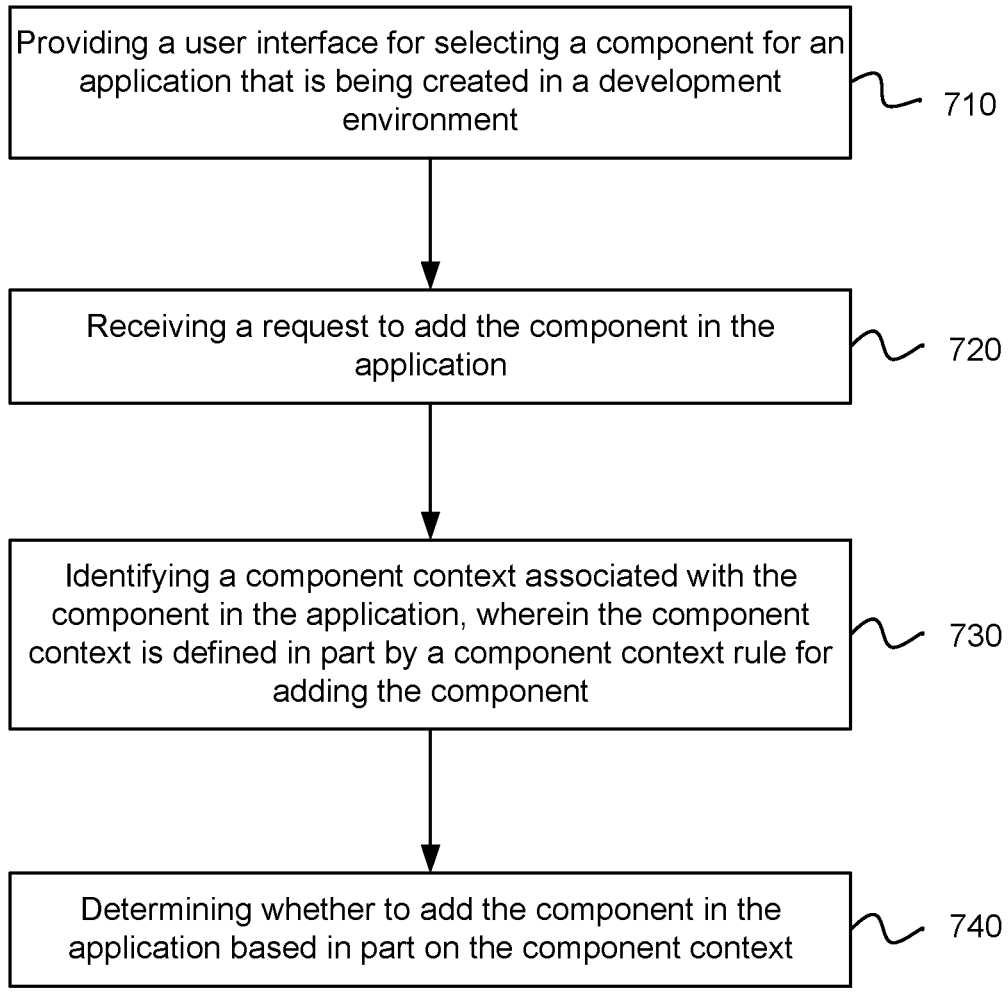
FIG. 7 is a flowchart of an example method for adding a component in an application based in part on a component context.

FIG. 7 illustrates an example of a method for adding a component in an application based in part on a component context. The application may be created in a development environment. A user interface may be provided for selecting a component, as in block 710. For example, the component may be selected based on the component context for adding to the application that is being created in the development environment.

A request to add the component in the application may be received, as in block 720. The request may be to add the component to a level in the application, a layer in the application, an object that corresponds to a game object in the application, or a collection of configured objects in the application. The level, the layer, the object or the collection of configured objects may correspond to an element, such as a world element. The component may have one or more settings or properties, which may be adjustable to obtain a defined behavior or functionality to an object, layer, etc. to which the component is added. The component may be associated with a category, such as animation, camera, gameplay, etc.

A component context associated with the component may be identified in the application, as in block 730. The component context may be defined in part by a component context rule for adding the component. The component context may define certain contexts for which the component is permitted to be added, the component is not permitted (or not recommended) to be added, or the component is to be added with other components. In other words, the component may be permitted to be added in certain contexts, in accordance with the component context.

A determination of whether to add the component in the application may be made based in part on the component context, as in block 740. For example, when the component requested to be added is determined to satisfy the component context, the component may be added in the application. In another example, when the component requested to be added is determined to not satisfy the component context, the component may not be added in the application or a recommendation may be provided to not add the component.

Figure 8:
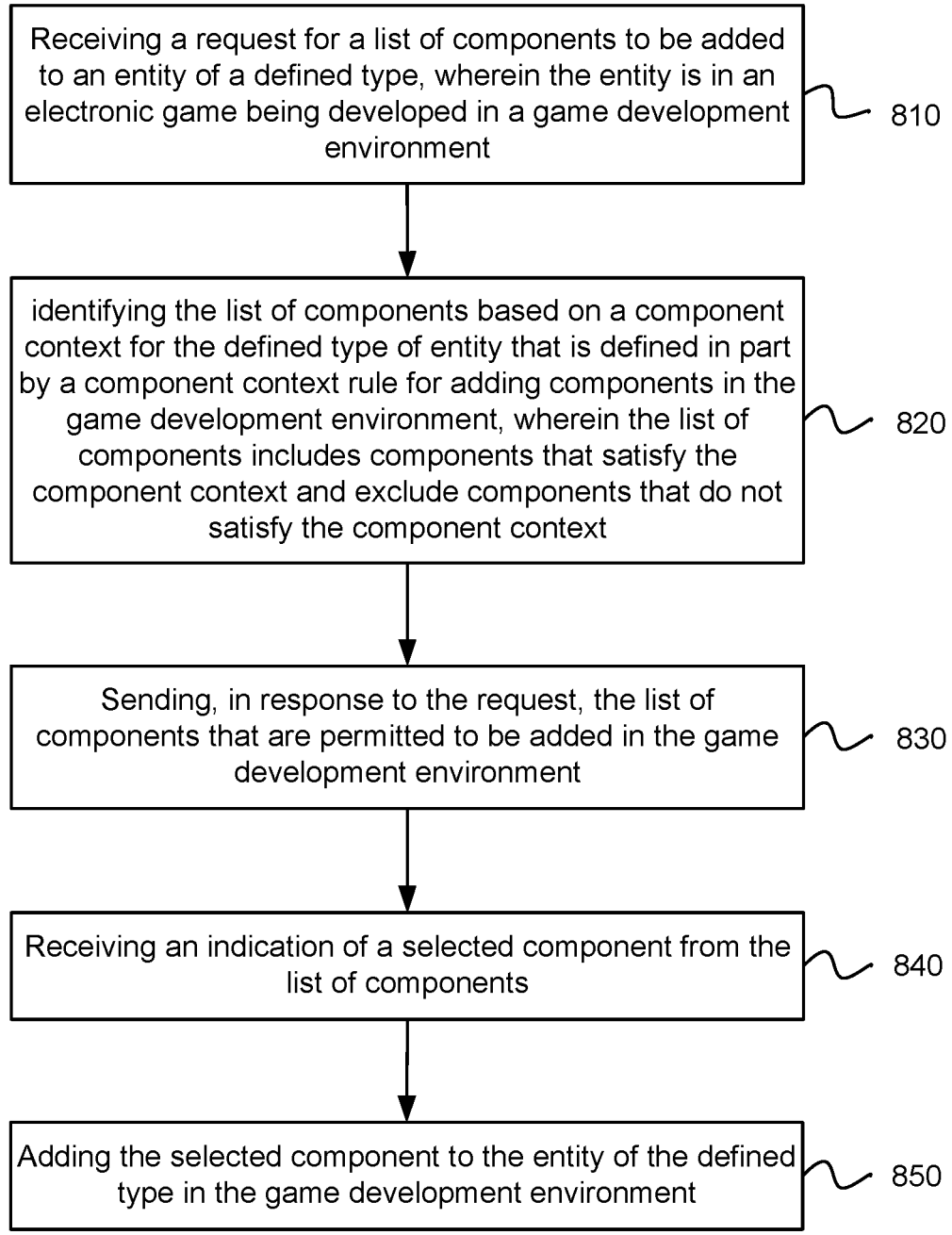
FIG. 8 is a flowchart of an example method for adding a component in a development environment.

FIG. 8 illustrates an example of a method for adding a component in a development environment. A request may be received for a list of components that are permitted to be added to an entity of a defined type, as in block 810. The request may be received from a development environment or a developer computing device. The entity may be included in a video game being developed in a game development environment. In addition, the defined type associated with the entity may be a list, a level, an object or an object collection.

The list of components may be identified based on a component context that is defined in part by a component context rule for adding components in the game development environment, as in block 820. The list of components may be filtered to include components that satisfy the component context and exclude components that do not satisfy the component context. In other words, components that do not satisfy the component context may not be included in the list, whereas components that satisfy the component context may be included in the list.

The list of components that are permitted to be added in the game development environment may be sent, as in block 830. For example, in response to the request, the list of components may be sent to the development environment or developer computing device for display on a user interface. The components in the list may be compatible with the entity of the defined type based on the component context associated with the components.

An indication of a selected component from the list of components may be received, as in block 840. For example, the indication of the selected component may be received via the user interface of the development environment or developer computing device. The user interface may include a drop-down menu, buttons, multi-pick box, check boxes, radio buttons, etc. that enable a developer to select the component from the list of components displayed on the user interface.

The selected component may be added to the entity of the defined type in the game development environment, as in block 850. The entity may be a level, a layer, an object, an object collection or another entity type in the game development environment. The selected component may provide a defined behavior or functionality to the entity in which the component is added.

In one configuration, a request to add one or more components to an entity in an application may be received. The request may be received via a user interface or opening a window in a user interface (as in FIGS. 5B and 5C). For example, the entity may be selected using the user interface, and the request to add the one or more components to the selected entity may be received via the user interface. The entity may be a level, a layer, an object, an object collection or another entity type in a development environment. Component contexts associated with the one or more components in the application may be identified. The component contexts may be defined in part by component context rules for adding the one or more components. A determination may be made as to whether the one or more components satisfy the component contexts. The one or more components that satisfy the component contexts may be associated with the entity as requested, whereas the one or more components that do not satisfy the component contexts may not be associated with the entity as requested. The one or more components that satisfy the component contexts may be added to the entity via the user interface. For example, the user interface may display the one or more components that satisfy the component contexts, and the one or more components may be selected to be added to the entity.

Figure 9:
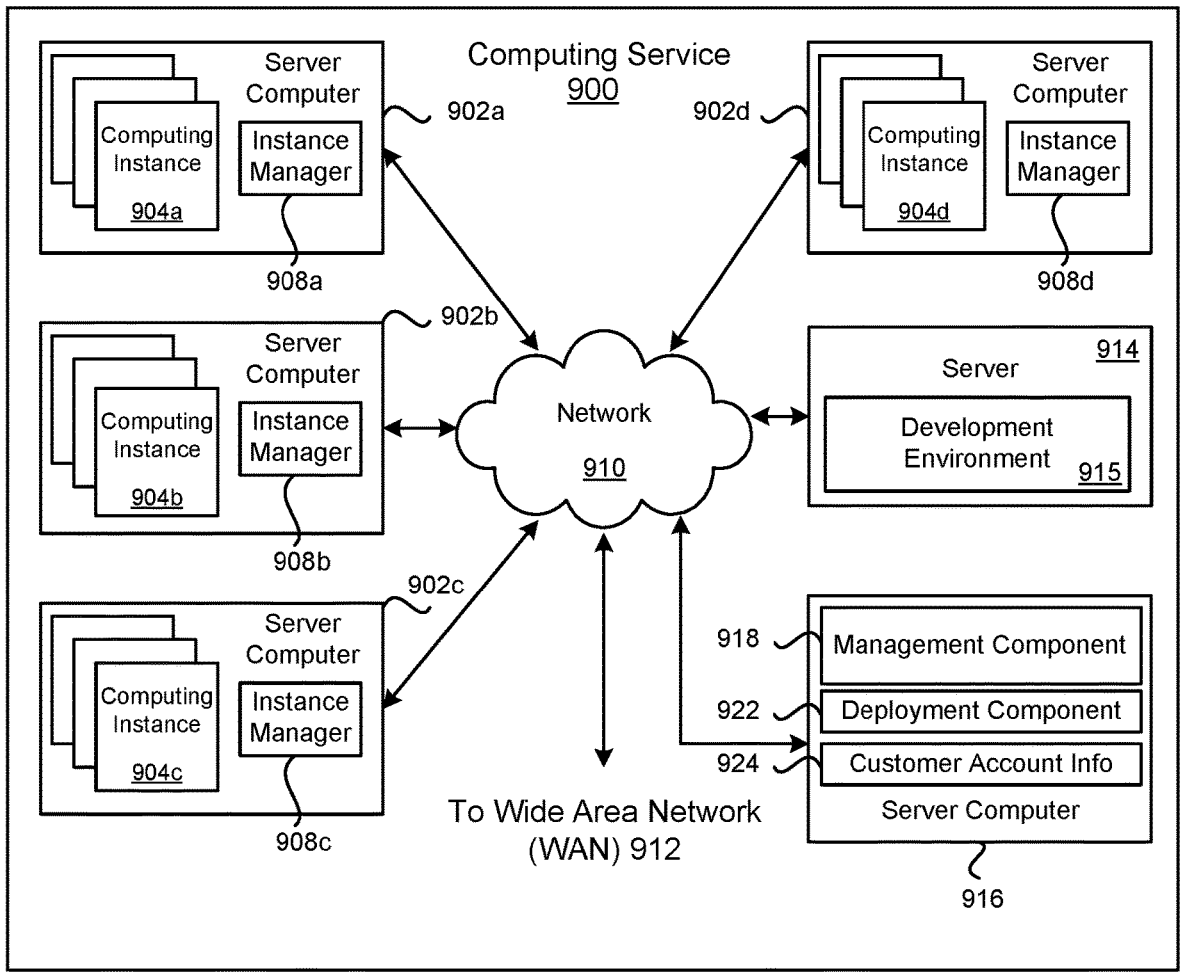
FIG. 9 is a block diagram of a service provider environment according to an example of the present technology.

FIG. 9 is a block diagram illustrating an example computing service 900 that may be used to execute and manage a number of computing instances 904*a-d* upon which the present technology may execute. In particular, the computing service 900 depicted illustrates one environment in which the technology described herein may be used. The computing service 900 may be one type of environment that includes various virtualized service resources that may be used, for instance, to host computing instances 904*a-d*.

The computing service 900 may be capable of delivery of computing, storage and networking capacity as a software service to a community of end recipients. In one example, the computing service 900 may be established for an organization by or on behalf of the organization. That is, the computing service 900 may offer a "private cloud environment." In another example, the computing service 900 may support a multi-tenant environment, wherein a plurality of customers may operate independently (i.e., a public cloud environment). Generally speaking, the computing service 900 may provide the following models: Infrastructure as a Service ("IaaS") and/or Software as a Service ("SaaS"). Other models may be provided. For the IaaS model, the computing service 900 may offer computers as physical or virtual machines and other resources. The virtual machines may be run as guests by a hypervisor, as described further below. The PaaS model delivers a computing system that may include an operating system, programming language execution environment, database, and web server.

Application developers may develop and run their software solutions on the computing service system without incurring the cost of buying and managing the underlying hardware and software. The SaaS model allows installation and operation of application software in the computing service 900. End customers may access the computing service 900 using networked client devices, such as desktop computers, laptops, tablets, smartphones, etc. running web browsers or other lightweight client applications, for example. Those familiar with the art will recognize that the computing service 900 may be described as a "cloud" environment.

The particularly illustrated computing service 900 may include a plurality of server computers 902*a-d*. The server computers 902*a-d* may also be known as physical hosts. While four server computers are shown, any number may be used, and large data centers may include thousands of server computers. The computing service 900 may provide computing resources for executing computing instances 904*a-d*. Computing instances 904*a-d* may, for example, be virtual machines. A virtual machine may be an instance of a software implementation of a machine (i.e. a computer) that executes applications like a physical machine. In the example of a virtual machine, each of the server computers 902*a-d* may be configured to execute an instance manager 908*a-d* capable of executing the instances. The instance manager 908*a-d* may be a hypervisor, virtual machine manager (VMM), or another type of program configured to enable the execution of multiple computing instances 904*a-d* on a single server. Additionally, each of the computing instances 904*a-d* may be configured to execute one or more applications.

A server 914 may operate a development environment 915. The server 914 may receive a request to add a component in the development environment 915. The request may be to add the component to an entity that corresponds to a level, a layer, an object or a collection of configured objects in the development environment 915. A component context associated with the component in the development environment 915 may be identified. The component context may be defined in part by a component context rule for adding the component in the development environment 915. A determination may be made that the component requested to be added does not satisfy the component context. A notification that the component context is not satisfied may be sent.

A server computer 916 may execute a management component 918. A customer may access the management component 918 to configure various aspects of the operation of the computing instances 904*a-d* purchased by a customer. For example, the customer may setup computing instances 904*a-d* and make changes to the configuration of the computing instances 904*a-d*.

A deployment component 922 may be used to assist customers in the deployment of computing instances 904*a-d*. The deployment component 922 may have access to account information associated with the computing instances 904*a-d*, such as the name of an owner of the account, credit card information, country of the owner, etc. The deployment component 922 may receive a configuration from a customer that includes data describing how computing instances 904*a-d* may be configured. For example, the configuration may include an operating system, provide one or more applications to be installed in computing instances 904*a-d*, provide scripts and/or other types of code to be executed for configuring computing instances 904*a-d*, provide cache logic specifying how an application cache is to be prepared, and other types of information. The deployment component 922 may utilize the customer-provided configuration and cache logic to configure, prime, and launch computing instances 904*a-d*. The configuration, cache logic, and other information may be specified by a customer accessing the management component 918 or by providing this information directly to the deployment component 922.

Customer account information 924 may include any desired information associated with a customer of the multi-tenant environment. For example, the customer account information may include a unique identifier for a customer, a customer address, billing information, licensing information, customization parameters for launching instances, scheduling information, etc. As described above, the customer account information 924 may also include security information used in encryption of asynchronous responses to API requests. By "asynchronous" it is meant that the API response may be made at any time after the initial request and with a different network connection.

A network 910 may be utilized to interconnect the computing service 900 and the server computers 902*a-d*, 916. The network 910 may be a local area network (LAN) and may be connected to a Wide Area Network (WAN) 912 or the Internet, so that end customers may access the computing service 900. In addition, the network 910 may include a virtual network overlaid on the physical network to provide communications between the servers 902*a-d*. The network topology illustrated in FIG. 9 has been simplified, as many more networks and networking devices may be utilized to interconnect the various computing systems disclosed herein.

Figure 10:
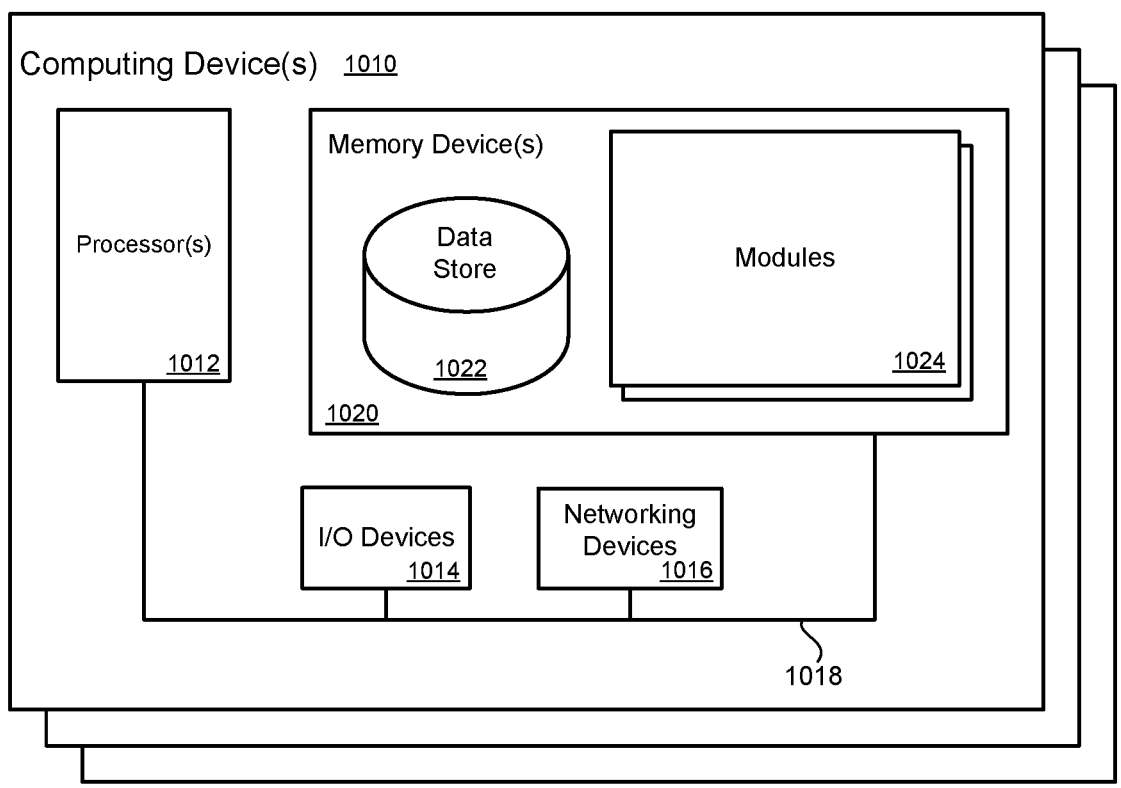
FIG. 10 is a block diagram that provides an example illustration of a computing device that may be employed in the present technology.

FIG. 10 illustrates a computing device 1010 on which modules of this technology may execute. The computing device 1010 is illustrated on which a high level example of the technology may be executed. The computing device 1010 may include one or more processors 1012 that are in communication with memory devices 1020. The computing device may include a local communication interface 1018 for the components in the computing device. For example, the local communication interface may be a local data bus and/or any related address or control busses as may be desired.

The memory device 1020 may contain modules 1024 that are executable by the processor(s) 1012 and data for the modules 1024. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. An example of an I/O device is a display screen that is available to display output from the computing devices. Other known I/O device may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A non-transitory computer readable storage medium having instructions embodied thereon, the instructions, when executed by one or more processors, cause the one or more processors to perform a process including:
   receiving a request for a list of components capable of being added to an entity of a video game being developed in a game development environment;
   identifying the list of components based on a component context associated with a defined type of the entity of the video game, wherein the component context includes a component context rule for adding components in the entity of the video game, such that the list of components includes components that satisfy the component context rule and excludes components that do not satisfy the component context rule;
   providing, in response to the request for the list of components, the list of components that are capable of being added to the entity of the video game including the components that satisfy the component context rule;
   receiving an indication of a selected component from the list of components; and
   adding the selected component from the list of components to the entity of the video game being developed in the game development environment.

2. The non-transitory computer readable storage medium of claim 1, wherein the instructions, when executed by the one or more processors, further cause the one or more processors to perform the process including: providing a user interface that enables the selected component from the list of components to be added when the selected component from the list of components satisfies the component context rule.

3. The non-transitory computer readable storage medium of claim 1, wherein the instructions, when executed by the one or more processors, further cause the one or more processors to perform the process including: initializing the list of components in accordance with a dependency order, and wherein components from the list of components that have dependencies on other components from the list of components are initialized prior to components from the list of components that do not have dependencies on other components from the list of components.

4. The non-transitory computer readable storage medium of claim 1, wherein the component context includes an editor context and a runtime game context, and wherein the runtime game context is created when a functionality of the selected component from the list of components is tested in a game runtime environment.

5. A system, comprising:
 at least one processor; and
 at least one memory device including a data store to store a plurality of data elements and instructions that, when executed, cause the system to:
  receive a request for a list of components that are permitted to be added to an entity of a defined type, wherein the entity of the defined type is in an application being developed in an application development environment;
  identify the list of components based on a component context that is defined in part by a component context rule for adding components to the entity of the defined type in the application being developed in the application development environment, wherein the list of components includes components that satisfy the component context and excludes components that do not satisfy the component context; and
  send, in response to the request for the list of components, the list of components that are permitted to be added to the entity of the defined type in the application being developed in the application development environment including the components that satisfy the component context for display on a user interface that allows a user to select a selected component from the list of components to be added to the entity of the defined type in the application being developed in the application development environment.

6. The system of claim 5, wherein the plurality of data elements and instructions, when executed, further cause the system to:
 receive an indication of the selected component from the list of components; and
 add the selected component from the list of components to the entity of the defined type in the application being developed in the application development environment.

7. The system of claim 5, wherein the user interface enables components from the list of components to be added when the components from the list of components satisfy the component context.

8. The system of claim 5, wherein the plurality of data elements and instructions, when executed, further cause the system to: assign multiple component contexts to a component from the list of components, and wherein the component from the list of components is permitted to be added to the entity of the defined type which corresponds to at least one of a level, a layer, an object, or a collection of configured objects based on the multiple component contexts, which are associated with the component from the list of components, being satisfied.

9. A method, comprising:
 receiving a request for a list of components capable of being added to an entity of a video game being developed in a game development environment;
 identifying the list of components based on a component context associated with a defined type of the entity of the video game, wherein the component context includes a component context rule for adding components in the entity of the video game, such that the list of components includes components that satisfy the component context rule and excludes components that do not satisfy the component context rule;
 providing, in response to the request for the list of components, the list of components that are capable of being added to the entity of the video game including the components that satisfy the component context rule;
 receiving an indication of a selected component from the list of components; and
 adding the selected component from the list of components to the entity of the video game being developed in the game development environment.

10. The method of claim 9, further comprising: providing a user interface that enables the selected component from the list of components to be added when the selected component from the list of components satisfies the component context rule.

11. The method of claim 9, further comprising: initializing the list of components in accordance with a dependency order, wherein components from the list of components that have dependencies on other components from the list of components are initialized prior to components from the list of components that do not have dependencies on other components from the list of components.

12. The method of claim 9, wherein the component context includes an editor context and a runtime game context, and wherein the runtime game context is created when a functionality of the selected component from the list of components is tested in a game runtime environment.

13. A method, comprising:
 receiving a request for a list of components that are permitted to be added to an entity of a defined type, wherein the entity of the defined type is in an application being developed in an application development environment;
 identifying the list of components based on a component context that is defined in part by a component context rule for adding components to the entity of the defined type in the application being developed in the application development environment, wherein the list of components includes components that satisfy the component context and excludes components that do not satisfy the component context; and
 sending, in response to the request for the list of components, the list of components that are permitted to be added to the entity of the defined type in the application being developed in the application development environment including the components that satisfy the component context for display on a user interface that allows a user to select a selected component from the list of components to be added to the entity of the defined type in the application being developed in the application development environment.

14. The method of claim 13, further comprising:
receiving an indication of the selected component from the list of components; and
adding the selected component from the list of components to the entity of the defined type in the application being developed in the application development environment.

15. The method of claim 13, wherein the user interface enables components from the list of components to be added when the components from the list of components satisfy the component context.

16. The method of claim 13, further comprising: assigning multiple component contexts to a component from the list of components, wherein the component from the list of components is permitted to be added to the entity of the defined type which corresponds to at least one of a level, a layer, an object, or a collection of configured objects based on the multiple component contexts, which are associated with the component from the list of components, being satisfied.

* * * * *